United States Patent Office.

GILMAN HOOK, OF WEST HARWICH, MASSACHUSETTS.

Letters Patent No. 75,915, dated March 24, 1868.

IMPROVED MARINE PAINT.

The Schedule referred to in these Letters Patent and making part of the same.

TO ALL WHOM IT MAY CONCERN:

Be it known that I, GILMAN HOOK, of West Harwich, in the county of Barnstable, and State of Massachusetts, have invented new and improved Marine Paint; and I do hereby declare that the following is a full and exact description thereof.

My improved marine paint is produced by incorporating a pasty mixture of white lead and boiled linseed oil with a pasty solution of caoutchouc, or gutta percha, and a sufficient proportion of boiled linseed oil to reduce the mixture to a proper condition to be spread with a brush upon wooden, metallic, or canvas surfaces. I have produced the best paint by the combination of a pasty mixture of white lead and boiled linseed oil with about an equal portion of a pasty solution of caoutchouc, or gutta percha, and a sufficient quantity of boiled linseed oil to reduce the paint to the desired working condition. The caoutchouc, or gutta percha, may be reduced to a pasty condition by the use of naphtha, oil, or any other suitable solvent.

When my improved paint is prepared especially for the covering of surfaces that are to be exposed to the action of salt water, I may find that the incorporation therewith of a small portion of arsenic may be desirable. Any desired color can be given to this paint by incorporating the proper pigments therewith, in a manner well known to practical painters.

The surface produced by the use of my improved paint is remarkably adhesive, tough, elastic, and durable, when exposed to the action of air or water. When the bottoms of marine vessels have been thoroughly and sufficiently coated with this, my improved paint, it has been found to prevent the attachment thereto of barnacles and other parasitical or vegetable growths, and also the ravages of the teredo or "borer."

Having thus fully described my improved marine paint, I would remark that I do not intend to limit myself to any precise proportions of either of the ingredients employed in its production, whilst the paint produced by the combination of said ingredients shall be substantially the same as that herein described.

What I claim as my invention, and desire to secure by Letters Patent, is—

The combination of white lead and boiled linseed oil with dissolved caoutchouc, or gutta percha, in the production of a paint, substantially as herein described.

GILMAN HOOK.

Witnesses:
JOHN B. FOLGER,
W. H. LEWIS.